W. H. WHITE.
Cane-Stripper.
No. 36,120. Patented Aug. 5, 1862.
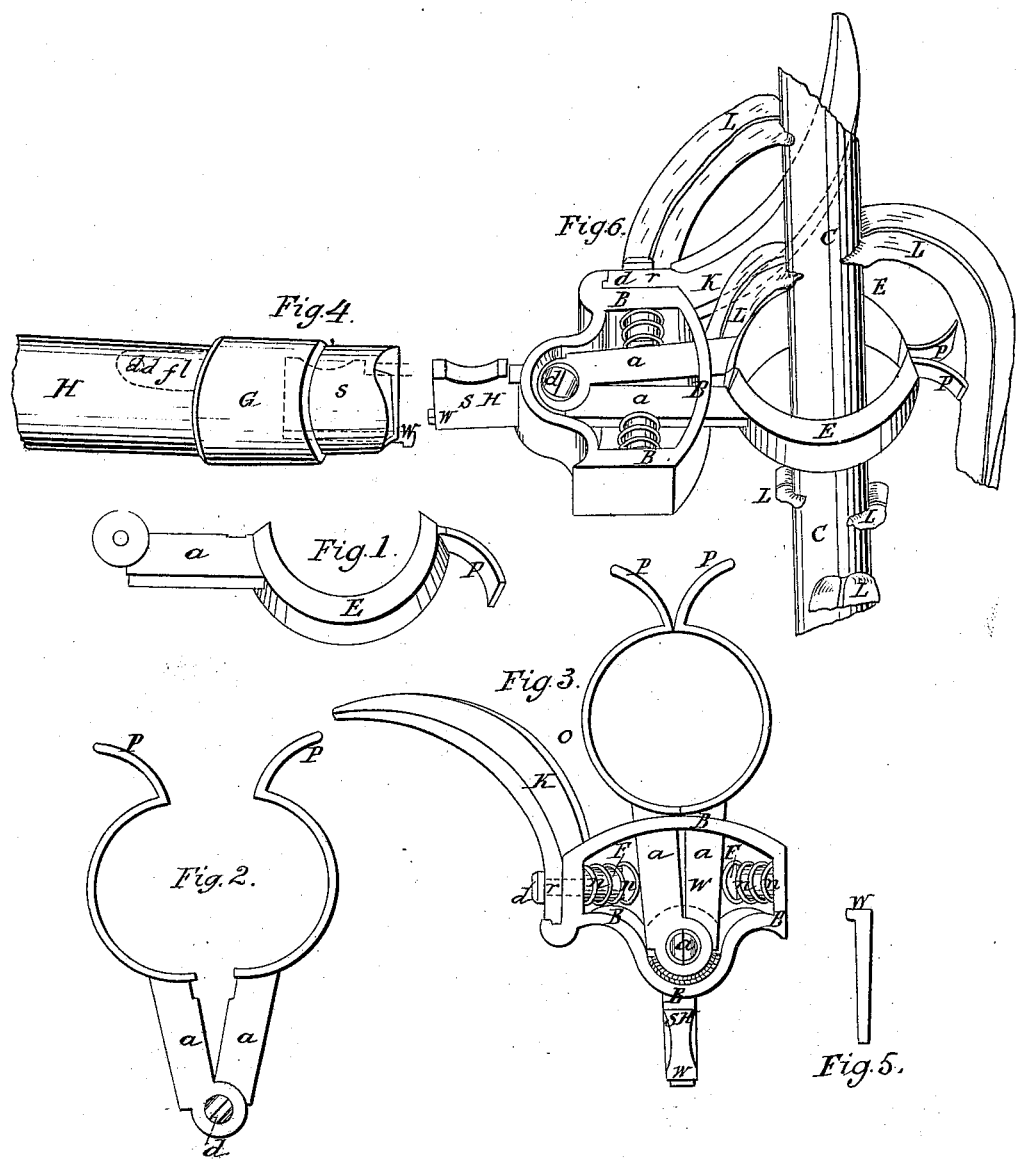

UNITED STATES PATENT OFFICE.

WELLS H. WHITE, OF DUBUQUE, IOWA.

IMPROVEMENT IN CUTTERS FOR SUGAR-CANE, SORGHUM, &c.

Specification forming part of Letters Patent No. 36,120, dated August 5, 1862.

*To all whom it may concern:*

Be it known that I, WELLS H. WHITE, of Dubuque, in the county of Dubuque, in the State of Iowa, have invented a new and Improved Machine for Trimming Sorghum or Chinese Sugar-Cane, it being an improvement on a machine for the same purpose by me; and I do hereby declare that the following is a full and exact description thereof, reference being had to the accompanying drawings, and to the letters of reference marked thereon.

My machine is intended for trimming and cutting down sorghum or Chinese sugar-cane, and rendering it ready to be run through the press or rollers, and by its use it is confidently believed by your petitioner that four-fifths of the usual labor is saved to the sugar-producers of northern States. In the construction of this machine I use three knives, a frame, a socket-ferrule, a handle, a key, and two spiral springs and two screws.

Figure 1 represents a side view of one of the semicircular knives. E represents the edge of it, which is upward or at a right angle with the shank $a$ of the knife. P represents a bend on a continuation of the knife, so that when the knives are in juxtaposition in the frame, as seen at letters B B in Figs. 3 and 6, and are pushed against a cane or stalk of sorghum, they will separate and admit the cane within the two semicircular knives, and thus completely surround the cane.

Fig. 2 represents a front view of the two circular knives open and in a position to receive the cane. $d$ is a screw which goes through both shanks $a$ $a$ and into the frame B B, as seen in Fig. 3, and holds the two knives in their position in the frame.

Fig. 3 represents a front view of the machine with the third knife attached, and also the two spiral springs $n$ $n$, and the two blocks F F, on which they work against the backs of the knives and on the insides of the frame B B. Letter K on Fig. 3 represents this third knife, which is circular in form and is screwed to the left side of the frame, as seen at the letters $d$ $r$. It is used for cutting the stalk down after it is trimmed with the other two knives.

Fig. 4 is a socket-ferrule, which receives the handle H and the shank of the frame S H. The part seen at G is the ferrule, and has a flange, $f\ l$, on one side for the purpose of securing the handle H in its place, which is done by means of the screw $d$ $d$. S is the socket end, into which the shank S H goes, as shown by the dotted lines.

Fig. 5 is a key, which goes under the shank of the frame, as seen at W in Fig. 4, when the shank is put into the socket S, (see dotted line around $s$,) and which holds the frame and socket-ferrule firmly together.

Fig. 6 represents the whole machine (with the exceptions of joining Figs. 4 and 6 together) complete, the two circular knives inclosing a cane of sorghum, and the third knife, K, screwed on the left side of the frame, and it shows the machine in its upward movement, having already cut off several leaves, L L L, from the cane C C. The screw $d$ $r$ holds the side knife firmly to the frame. The shank $a$ $a$ of the circular knives can be extended beyond the frame from one-fourth to two inches, if need be.

The machine is used with a handle about four feet long, and is operated with both hands. In the first place the machine is raised to near the top of the cane and just below the seed end of it, so that it is between the backs of the knives, as seen at O in Fig. 3. Then with a turn of the machine in the hands the cane is lopped over, so as to hang down. The machine is then withdrawn, carried down to the bottom of the stalk, forced around it, and then with one quicker upward motion the whole cane is trimmed and the top cut clean from the stalk. When this is done, with one draw cut with the side knife the cane is cut down and falls ready for the mill.

With this instrument I claim that one man can do as much work in one day as can be done in the ordinary way and same time by four or five men, and with much greater ease.

What I claim therefore as my invention, and desire to secure by Letters Patent, is—

1. The combination of the two semicircular knives and the cycle-shaped knife, as seen at Figs. 2 and 3, and placed in the frame B B, or any two circular knives, whether made into one or more pieces of steel and held together by springs.

2. The semicircular knives as shown in

Figs. 1 and 2 and letters a E P, and the encircling of the cane with sharp edges, for the use and purposes herein described.

3. The mode of fastening the shank S H into the socket-ferrule, as seen in Fig. 4, and letters G and S and the dotted lines.

4. The combination of the frame as seen at Figs. 3 and 6, and operated as above specified, and for the purposes set forth.

WELLS H. WHITE.

Witnesses:
PLATT SMITH,
W. W. HAMILTON.